(12) United States Patent
Neufang et al.

(10) Patent No.: US 7,435,000 B2
(45) Date of Patent: Oct. 14, 2008

(54) GUIDE CARRIAGE OF A LINEAR ROLLING BEARING

(75) Inventors: Lothar Neufang, Homburg/Saar (DE); Peter Keller, Bruchmuhlbach-Miesau (DE)

(73) Assignee: INA-Schaeffler KG, Herzogenaurach (DE)

( * ) Notice: Subject to any disclaimer, the term of this patent is extended or adjusted under 35 U.S.C. 154(b) by 328 days.

(21) Appl. No.: 10/565,232

(22) PCT Filed: Jun. 23, 2004

(86) PCT No.: PCT/EP2004/006753

§ 371 (c)(1), (2), (4) Date: Jan. 31, 2006

(87) PCT Pub. No.: WO2005/019667

PCT Pub. Date: Mar. 3, 2005

(65) Prior Publication Data

US 2006/0177163 A1   Aug. 10, 2006

(30) Foreign Application Priority Data

Jul. 19, 2003 (DE) ................................ 103 32 922

(51) Int. Cl.
*F16C 29/06* (2006.01)
*F16C 33/10* (2006.01)

(52) U.S. Cl. .............................. 384/45; 384/13; 384/15

(58) Field of Classification Search ............. 384/13–15, 384/43–45
See application file for complete search history.

(56) References Cited

U.S. PATENT DOCUMENTS

| 4,067,414 | A | | 1/1978 | Funke | |
|---|---|---|---|---|---|
| 4,582,369 | A | * | 4/1986 | Itoh | 384/13 |
| 5,139,347 | A | * | 8/1992 | Hattori | 384/15 |
| 5,145,261 | A | * | 9/1992 | Narumiya | 384/45 |
| 5,380,096 | A | | 1/1995 | Tanaka | |
| 5,399,023 | A | | 3/1995 | Winkelmann et al. | |
| 5,496,113 | A | * | 3/1996 | Winkelmann et al. | 384/13 |

(Continued)

FOREIGN PATENT DOCUMENTS

| DE | 17 37 635 | 1/1957 |
|---|---|---|
| DE | 17 64 875 | 4/1958 |
| DE | 41 41 038 | 6/1993 |
| DE | 42 10 299 | 9/1993 |
| DE | 43 30 772 | 3/1995 |

(Continued)

*Primary Examiner*—Marcus Charles
(74) *Attorney, Agent, or Firm*—Charles A. Muserlian

(57) ABSTRACT

A guide carriage of a linear roller bearing, having at least one endless raceway for rolling bodies (9), and having a carrying body (1), on the two longitudinal sides of which in each case one carrying section (2, 3) and one return section (5, 6) of the endless raceway is provided, the carrying section (2, 3) being provided rolling bodies (9) which roll under load and the return section (5, 6) being provided for rolling bodies (9) which return without load, and having head pieces (13) which are arranged on end sides of the carrying body (1) and in each case have one deflection section (11, 12) which connects the return section (5, 6) to the carrying section (5, 6) a lubricant channel (24) being provided for the supply of lubricant, which lubricant channel (24) can be connected to the raceway of the rolling body (9) via a valve (30), the valve (30) having a slot (33) which is provide for the passage of lubricant, crosses the cross section of the lubricant channel (24) and is delimited by slot faces (34), the slot faces (34) bearing against one another when the valve (30) is shut, with the slot (33) being closed.

13 Claims, 3 Drawing Sheets

U.S. PATENT DOCUMENTS

| | | |
|---|---|---|
| 5,584,581 A | 12/1996 | Keller et al. |
| 5,694,811 A * | 12/1997 | Tsukada .................. 384/13 |
| 5,727,884 A * | 3/1998 | Greiner et al. ............ 384/45 |
| 6,024,490 A * | 2/2000 | Shirai ..................... 384/45 |
| 6,203,199 B1 | 3/2001 | Pfeuffer |
| 6,250,804 B1 * | 6/2001 | Hsu et al. ................ 384/13 |
| 6,672,764 B2 * | 1/2004 | Tsukada et al. .......... 384/45 |

FOREIGN PATENT DOCUMENTS

| | | |
|---|---|---|
| DE | 44 12 797 | 10/1995 |
| DE | 197 53 104 | 6/1999 |
| EP | 0 207 189 | 1/1987 |
| EP | 0 919 738 | 6/1999 |
| GB | 764 749 | 1/1957 |

* cited by examiner

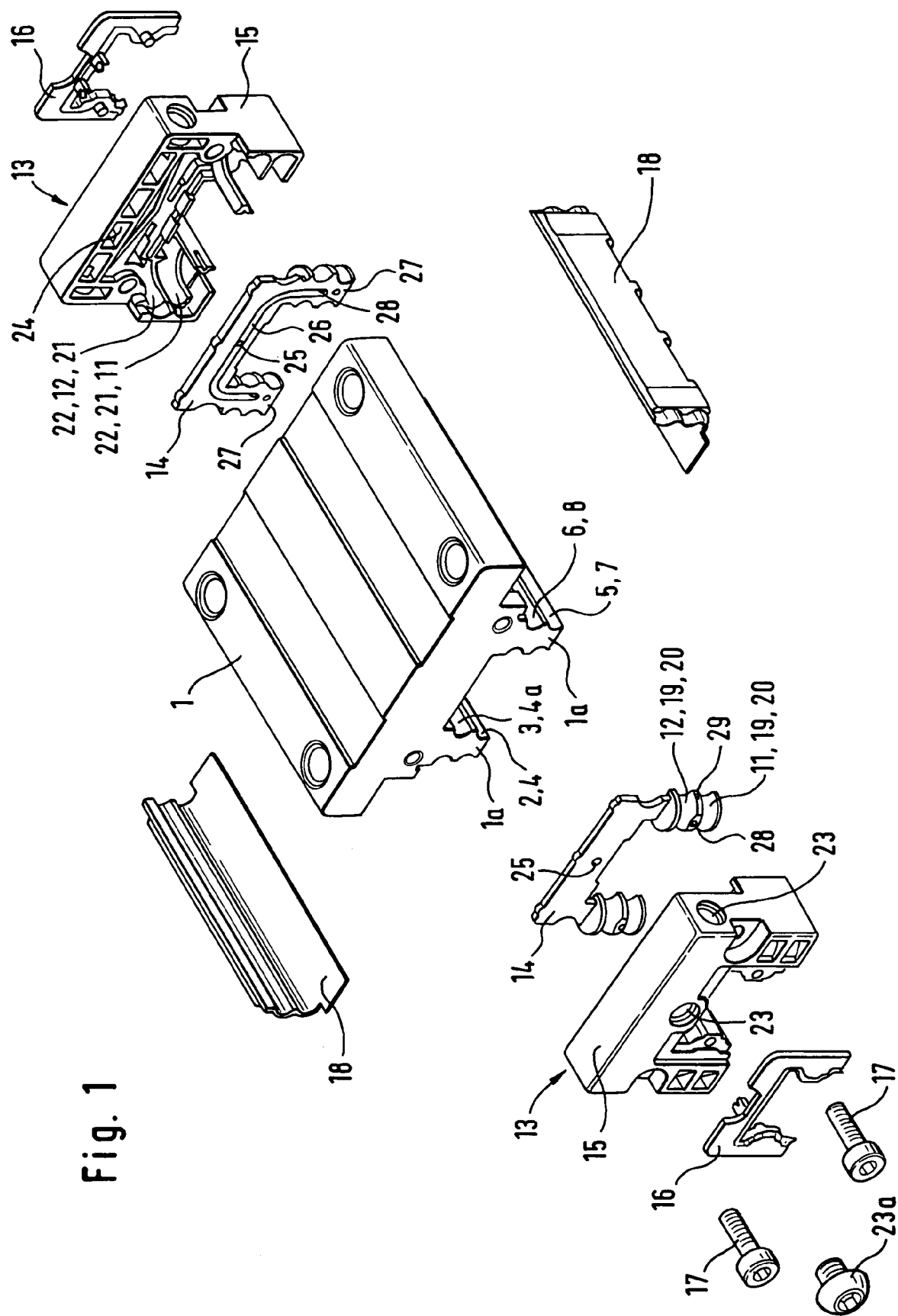

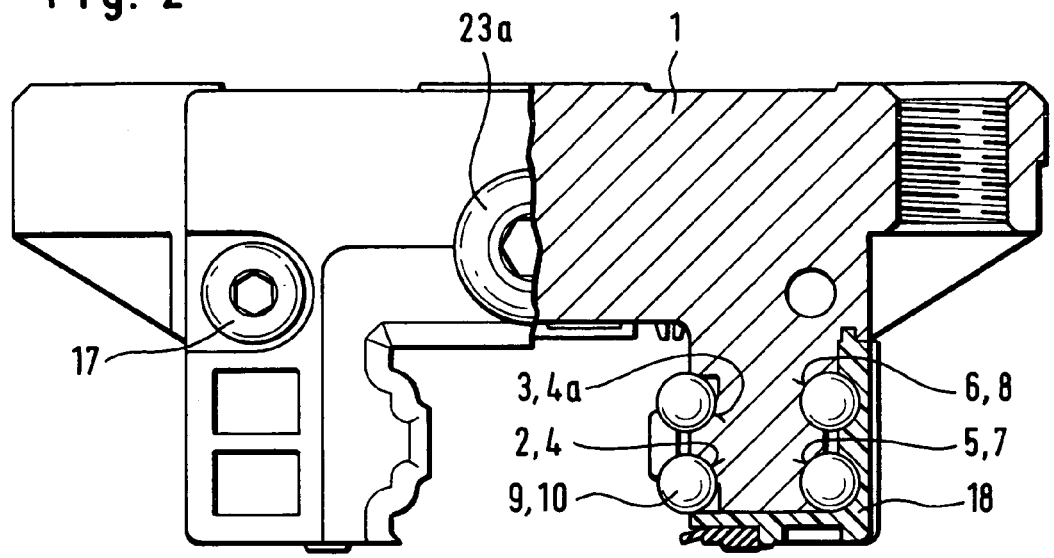
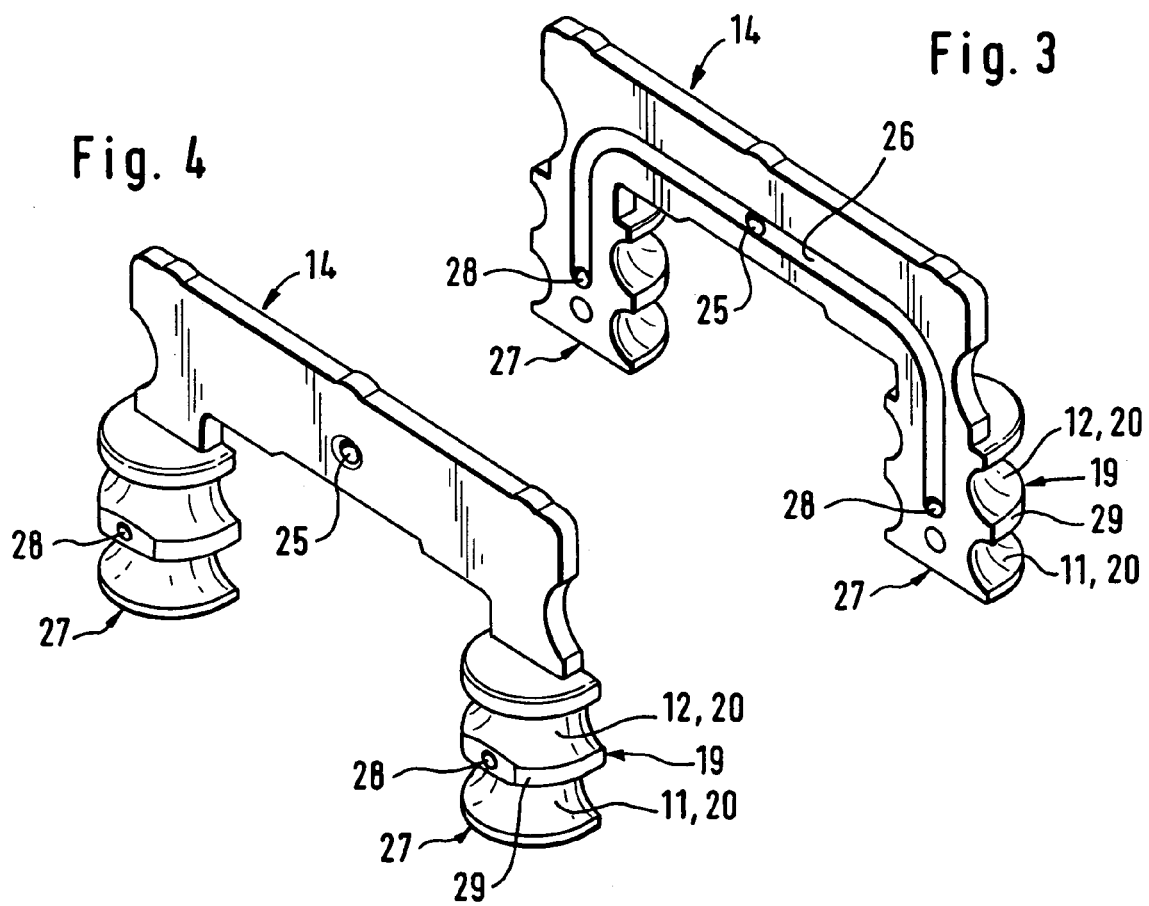

GUIDE CARRIAGE OF A LINEAR ROLLING BEARING

This application is a 371 of PCT EP 2004/006753 filed Jun. 23, 2004.

The present invention relates to a guide carriage of a linear roller bearing. Guide carriages of this type are often provided with one or more lubricant channels, in order to take lubricant to the desired lubricating points of the linear roller bearing.

BACKGROUND OF THE INVENTION

For example, DE 42 10 299 A1 has disclosed a guide carriage according to the features of the precharacterizing clause of claim 1. A lubricating nipple is arranged on the head piece, which lubricating nipple is connected to a lubricant channel. The lubricant channel ends at the inner deflection means of the head piece in the region of the deflection section. Sealing lips are configured on the head piece at this end of the lubricant channel, which sealing lips bear against the end side of the carrying body and close the end of the lubricant channel. In this way, it is ensured first of all that lubricant which is arranged in the lubricant channel cannot escape into the rolling body channel in an uncontrolled manner. For the purpose of relubrication, lubricant can then be pressed via the lubricating nipple through the lubricant channel, the sealing lips lifting off from the end face of the carrying body under the pressure which then prevails in the lubricant channel and the lubricant passing into the deflection section, that is to say into the rolling body channel. That part of the head piece which is provided with the sealing lips has to be of elastic configuration in such a way that it is possible for the sealing lips to be lifted off. Although guide carriages of this type make satisfactory relubrication possible, the configuration of the sealing lips can be complicated depending on the size of the guide carriage.

OBJECT OF THE INVENTION

It is an object of the present invention to specify a guide carriage of a linear roller bearing, having at least one endless raceway for rolling bodies, and having a carrying body, on the two longitudinal sides of which in each case one carrying section and one return section of the endless raceway is provided, the carrying section being provided rolling bodies which roll under load and the return section being provided for rolling bodies which return without load, and having head pieces which are arranged on end sides of the carving body and in each case have one deflection section which connects the return section to the carrying section, a lubricant channel being provided for the supply of lubricant, which lubricant channel can be connected to the raceway of the rolling body via a valve in which this disadvantage is eliminated. According to the invention, this disadvantage is solved by the fact that the valve has a slot which is provided for the passage of lubricant, crosses the cross section of the lubricant channel and is delimited by slot faces, the slot faces bearing against one another when the valve is shut, with the slot being closed. The slot is formed when the valve is open. The slot is preferably not formed when the valve is shut. In a deviation from the known guide carriages, the slot lies in the cross section of the lubricant channel and accordingly does not need to interact with the end face of the carrying body. This means that the component on which the valve is provided does not need per se to be of soft or elastic or movable configuration.

BRIEF SUMMARY OF THE INVENTION

At least one of the head pieces is preferably provided with the lubricant channel which can be connected to the deflection section via the valve, for supplying lubricant. Said head pieces which are also of multiple-part configuration are usually from plastic using the injection molding process. In this case, the valve can be formed integrally on the head piece or one of the parts of the head piece, it being possible for the slot to be taken into consideration without problems as early as during the injection molding process. The slot faces which delimit the slot are preferably pressed against one another elastically. This means that, outside of the relubrication intervals, the lubricant channel is closed when the slots are pressed against one another.

A funnel which is divided by the at least one slot into funnel segments which delimit the slot with slot faces which are adjacent to one another is suitable for the configuration of the valve in a particularly favorable manner. During relubrication, the funnel segments can be pressed apart from one another under the pressure of the lubricant, with the result that the slot faces lift off from one another and open the slot, with the result that lubricant passes through the slot and into the rolling body circulation. The funnel is preferably configured as a cone, which is favorable, in particular, if the funnel is manufactured from plastic using the injection molding process. If the lubricant channel has a first end which is situated at the deflection section and a second end at the lubricant feed opening, that is to say, for example, where the lubricating nipple is seated, it is expedient for the funnel tip of the funnel to face the first end. In other words, the funnel tip lies in the flow direction of the lubricant during the relubrication process. During relubrication, the pressing lubricant can press against the cone segments of the cone, the cone segments being pressed away from one another and opening the slot. It is not possible for lubricant to pass through the slot from the opposite side. This is because if lubricant is pressed in the direction of the cone tip during the displacement of the guide carriage, said lubricant presses against the outer cone faces of the cone segments and accordingly presses them together, with the result that the forces which close the slot increase further.

One refinement of the slot which is simple to produce in technical terms and is particularly favorable for the purpose of relubrication can consist in the fact that the funnel has slots in the shape of a cross, as viewed in the longitudinal direction of the lubricant channel. Accordingly, four funnel segments are formed which can be deflected elastically in each case, with the result that they open the cross slot. The slotted funnel is preferably manufactured from plastic, in particular using the injection molding process. If the funnel is arranged in the lubricant channel, the funnel segments can be formed integrally with their outer circumference on the wall of the lubricant channel, to be precise such that every segment can still be deflected elastically.

A further development according to the invention provides for the head piece to comprise a distributor plate which is formed from plastic and is provided with a branched distributor channel for the distribution of the lubricant, at the ends of which distributor channel transfer holes are provided, the slots being arranged in the transfer holes. The guide carriages are usually of approximately U-shaped configuration, as viewed in cross section. As viewed in cross section through the guide carriage, the distributor channel can begin, for example, centrally between the two limbs of the U-shaped profile and then be branched to both limbs of the guide carriage. The transfer holes end finally in the region of the deflection section, that is to say of the deflection channel. In this development according to the invention, it is also favorable if the funnel is formed integrally on the distributor plate. Furthermore, in order to reduce components, it is proposed that the deflection section has an inner deflection means, known per se, for the rolling bodies, the inner deflection means being configured integrally with the distributor plate. This means that a single component has the lubricant channel, the valve and also the inner deflection means. Parts of this type can be manufactured without problems from plastic using the injection molding process.

If the transfer hole opens at the inner deflection means, it is appropriate, according to a development according to the invention, for the inner deflection means to be provided with two adjacent ball grooves for in each case one endless raceway, the transfer holes then opening into a separating web which separates the two ball grooves. Firstly, this therefore ensures that the opening lies outside the raceway region of the rolling bodies and, secondly, this ensures that lubricant can pass equally into both ball grooves.

BRIEF DESCRIPTION OF THE DRAWINGS

In the following text, the invention will be described in greater detail using an exemplary embodiment which is shown in a total of eight figures, in which:

FIG. 1 shows a guide carriage according to the invention in an exploded illustration, but without a set of rolling bodies, FIG. 2 shows a cross section through the guide carriage according to the invention from FIG. 1, but with a set of rolling bodies fitted, FIG. 3 shows a distributor plate of the head piece of the guide carriage according to FIG. 1, in an enlarged perspective illustration, FIG. 4 shows the distributor plate from FIG. 3, in a different perspective illustration.

DETAILED DESCRIPTION OF THE INVENTION

Figure 5:
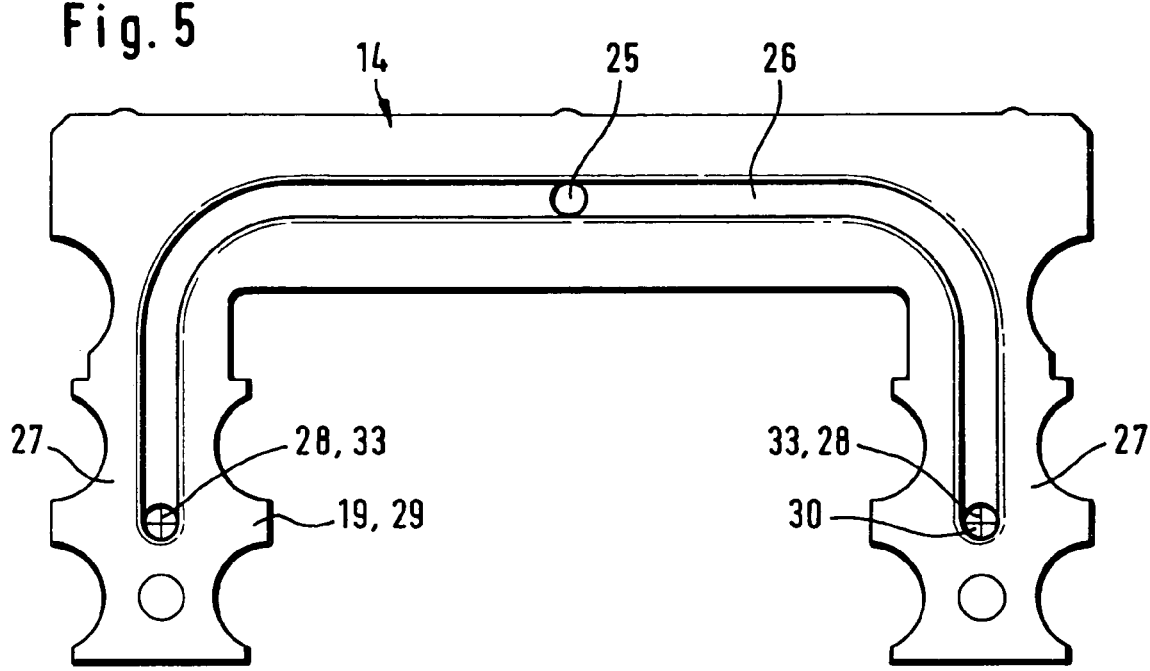
FIG. 5 shows the distributor plates from FIGS. 3 and 4, in a front view.

The guide carriage according to the invention from FIG. 1 comprises an approximately U-shaped carrying body 1, in each case two carrying sections 2, 3 which are configured as ball grooves 4, 5 in the present case being formed on the two limbs 1a of said carrying body 1, which limbs 1a are formed on the longitudinal sides. Furthermore, in each case two return sections 5, 6 which are likewise configured as ball grooves 7, 8 in the present case are formed on the two limbs 1a. Rolling bodies 9 which are shown in FIG. 2 and are configured here as balls 10 can roll under load on the carrying sections 2, 3. Said rolling bodies 9 can run back without load on the return sections 5, 6. The return sections 5, 6 and the carrying sections 2, 3 are connected endlessly to one another via deflection sections 11, 12, the deflection section 11 connecting the return section 5 endlessly to the carrying section 2 and the deflection section 12 connecting the return section 6 endlessly to the carrying section 3.

The deflection sections 11, 12 are formed on head pieces 13 which are flange connected to end sides of the carrying body 1. Each of the head pieces 13 comprises a distributor plate 14, an end piece 15 and a stripper plate 16. The distributor plate 14 and the end plate 15 are screwed to the carrying body 1 via screws 17.

Furthermore, as viewed in cross section, the two limbs 1a of the carrying body 1 are provided with L-shaped side parts 18 which cover the return sections 5, 6.

Each head piece 13 comprises an inner deflection means 19 and an outer deflection means 21 in a known manner. The inner deflection means 19 is formed on the distributor plate 14 and comprises two ball grooves 20, on which the balls 10 can roll. The outer deflection means 21 is formed on the end plate 15 and comprises ball grooves 22, on which the balls 10 can roll.

Both the distributor plate 14 and the end plate 15 are manufactured from plastic using the injection molding process.

Threaded holes 23 are configured on the end plate 15, into which threaded holes 23 screws 24 are screwed. A lubricating nipple (not shown here) for relubrication is screwed into at least one of said threaded holes 23. Said threaded holes 23 communicate with a lubricant channel 24 which is formed on the head piece 13. The lubricant channel 24 is formed both on the end plate 15 and on the distributor plate 14. Lubricant from that part of the lubricant channel 24 which is formed on the end plate 15 passes via a distributor hole 25 which is formed on the distributor plate 14 to a branched distributor channel 26 which is formed in the manner of a groove on that side of the distributor plate 14 which faces the carrying body 1. The distributor channel 26 extends approximately in a U shape to the two limbs 27 of the distributor plate 14. The two ends of the distributor channel 26 each open into a transfer hole 28 which are likewise formed on the distributor plate 14. On its side which faces away from the distributor channel 26, the transfer hole 28 ends in the region of the inner deflection means 19, to be precise it opens into a separating web 29 which separates the two ball grooves 20 of the inner deflection means 19 from one another.

As the finally mounted distributor plates 14 bear closely and tightly against the end side of the head piece 1, the distributor channel 26 is sealed off satisfactorily, with the result that lubricant can leave the distributor plate 14 only through the transfer holes 28.

The stripper plates 16 are clipped onto the end plates 15. If the guide carriage is placed on a guide rail (not shown here), said stripper plates 16 graze along the surface of the guide rails and remove, for example, contaminants, with the result that the latter cannot pass into the region of the raceways of the rolling bodies.

FIG. 2 shows the guide carriage according to the invention from FIG. 1, in a half cross section.

In the further FIGS. 3 to 8, the distributor plate 14 or details of it are shown only in different illustrations. FIGS. 3 and 4 in each case show a perspective illustration of the distributor plate 14, FIG. 3 showing the side clearly which faces the carrying body 1 and FIG. 4 showing the side clearly which faces away from the carrying body 1. The configuration of the distributor channel 26 which is formed in the manner of a groove can be seen particularly clearly from FIG. 3. Furthermore, the distributor hole 25 and the transfer holes 28 are also shown clearly. FIG. 4 shows that said transfer holes 28 end at the separating web 29 of the inner deflection means 19.

FIG. 5 shows a view of the distributor plate 14 from the side which faces the carrying body 1. The distributor channel 26, the distributor hole 25 and the transfer holes 28 are in turn shown clearly.

Figure 6:
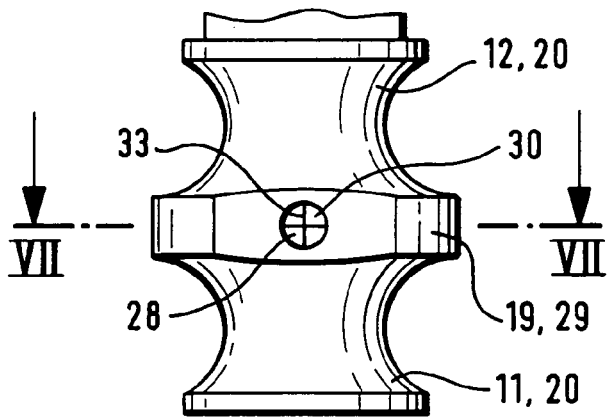
FIG. 6 shows a detail of the distributor plate, in an enlarged illustration.
Figure 7:
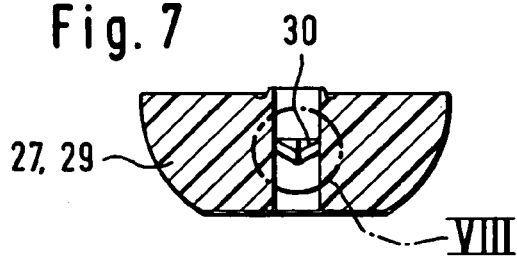
FIG. 7 shows a section through the distributor plate, according to the line VII-VII from FIG. 6.

FIG. 6 shows the region of the inner deflection means 19 of the distributor plate 14 in a greatly enlarged illustration, to be precise the side which faces away from the carrying body 1. Viewing FIGS. 6, 7 and 8 together clearly shows the arrangement of a valve 30 in the transfer hole 28. Said valve 30 is formed by a plateshaped cone 31, a cone tip 32 lying in the flow direction of the lubricant. The cone tip 32 thus faces the separating web 29. The cone 31 has slots in the shape of a cross, as can be seen, in particular, from FIG. 6. Said cross slot 33 is delimited by slot faces 34. The cone 31 is divided into four cone segments 35 by the cross slot 33. Each cone segment 35 is formed integrally at its outer circumference on the distributor plate 14.

Figure 8:
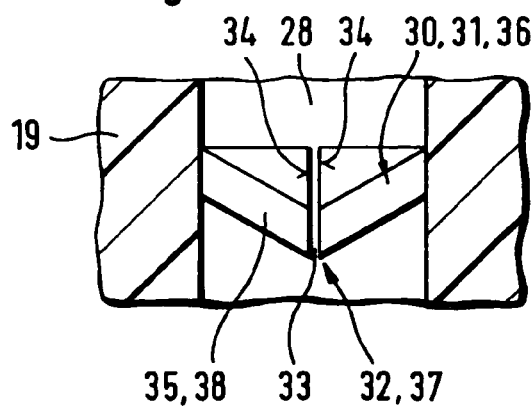
FIG. 8 shows a detail of the distributor plate from FIG. 7, in an enlarged illustration.

FIG. 8 shoes the configuration of the cross slot 33 clearly, in a section through the transfer hole 28. This illustration corresponds to the situation during relubrication of the guide carriage. Outside the relubrication intervals, the cross slot 33 is not formed, as the slot faces 34 which delimit the cross slot 33 bear tightly against one another. This is possible, as the cone segments 35 are pressed against one another in a resilient manner. If the lubricant channel 24 is acted on by further lubricant for relubrication, the lubricant flows from top to bottom, if the illustration according to FIG. 8 is taken as the basis, that is to say the lubricant presses against the inner cone face of the cone 31. The cone segments 35 yield to the pressure of the lubricant and move downward with spring-elastic deflection, and as a result open the cross slot 33. In this situation, the lubricant can pass through the cross slot 34 and into the deflection section 11, 12.

For this reason, the cone 31 operates here like a valve, as the cone segments 35 are pressed increasingly against one another in the event of an imaginary application of pressure in the opposite direction, with the result that the slot faces 34 bear against one another more firmly. This means that the cross slot 33 is not formed if pressure is applied in the opposite direction.

In a more general form, the cone 31 can also be called a funnel 36, it then being possible for the cone tip 32 to be called a funnel tip 37 and for the cone segments 35 to be called funnel segments 38. For example, the funnel 36 can also be formed by a plurality of flat faces which are arranged at oblique angles with respect to one another, in a different manner than in the case of a cone profile. The method of operation would not, however, differ from that of the cone.

The invention claimed is:

1. A guide carriage of a linear roller bearing, having at least one endless raceway for rolling bodies, and having a carrying body, on the two longitudinal sides of which in each case one carrying section and one return section of the endless raceway is provided, the carrying section being provided rolling bodies which roll under load and the return section being provided for rolling bodies which return without load, and having head pieces which are arranged on end sides of the carrying body and in each case have one deflection section which connects the return section to the carrying section, a lubricant channel being provided for the supply of lubricant, which lubricant channel can be connected to the raceway of the rolling body via a valve, wherein the valve has a slot which is provided for the passage of lubricant, crosses the cross section of the lubricant channel and is delimited by slot faces, the slot faces bearing against one another when the valve is shut, with the slot being closed, wherein at least one of the head pieces is provided with the lubricant channel which can be connected to the deflection section via the valve, for supplying lubricant, wherein the head piece comprises a distributor plate which is formed from plastic and is provided with a branched distributor channel, at the ends of which transfer holes are provided, the slots being arranged in the transfer holes, and wherein which the transfer hole opens at a inner deflection means.

2. The guide carriage claim 1, wherein the valve is arranged in the lubricant channel and is configured approximately as a funnel which is divided by at least one slot into funnel segments which delimit the slot with slot faces which are adjacent to one another.

3. The guide carriage of claim 2, wherein the funnel is configured as a cone.

4. The guide carriage of claim 2, wherein the lubricant channel is provided with a first end which is situated at the deflection section and with a second end which is situated at a lubricant feed opening, the funnel tip of the funnel facing the first end.

5. The guide carriage of claim 2, wherein the funnel tip of the funnel is arranged in the flow direction of the lubricant.

6. The guide carriage of claim 2, wherein the funnel has slots in the shape of a cross.

7. The guide carriage of claim 2, wherein the slotted funnel is manufactured from plastic, using the injection molding process.

8. The guide carriage of claim 1, wherein the slot faces which delimit the slot are pressed against one another elastically.

9. The guide carriage of claim 2, wherein the funnel is formed integrally on the distributor plate.

10. The guide carriage of claim 3, wherein the funnel is formed integrally on the distributor plate.

11. The guide carriage wherein claim 1, wherein the slot faces (34) are formed integrally on the distributor plate (14).

12. The guide carriage of claim 1, wherein the deflection section has the inner deflection means, for the rolling bodies, the inner deflection means being configured integrally with the distributor plate.

13. The guide carriage of claim 1, wherein the inner deflection means is provided with two adjacent ball grooves in each case for one endless raceway, the transfer hole opening into a separating web which separates the two ball grooves.

* * * * *